United States Patent
McDonald et al.

(10) Patent No.: US 9,219,821 B2
(45) Date of Patent: *Dec. 22, 2015

(54) DISPOSABLE TELEPHONE NUMBERS

(71) Applicant: AT&T Intellectual Property I, L.P., Atlanta, GA (US)

(72) Inventors: Randy McDonald, Roswell, GA (US); Odie Garrison, Alpharetta, GA (US); James Carlton Bedingfield, Sr., Lilburn, GA (US); Terry R. Droke, Lyles, TN (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,052

(22) Filed: May 30, 2014

(65) Prior Publication Data

US 2014/0301539 A1    Oct. 9, 2014

Related U.S. Application Data

(63) Continuation of application No. 13/936,230, filed on Jul. 8, 2013, now Pat. No. 8,774,384, which is a continuation of application No. 13/299,486, filed on Nov. 18, 2011, now Pat. No. 8,509,409, which is a continuation of application No. 12/283,446, filed on Sep. 12, 2008, now Pat. No. 8,085,921, which is a continuation of application No. 09/741,346, filed on Dec. 21, 2000, now Pat. No. 7,469,043.

(51) Int. Cl.
*H04M 3/42* (2006.01)
*H04M 3/56* (2006.01)
*H04L 29/12* (2006.01)
*H04M 15/00* (2006.01)

(52) U.S. Cl.
CPC .......... *H04M 3/56* (2013.01); *H04L 29/12103* (2013.01); *H04L 61/1535* (2013.01); *H04M 3/42008* (2013.01); *H04M 15/61* (2013.01)

(58) Field of Classification Search
CPC .......... H04L 61/1535; H04M 3/42008; H04M 15/61; H04M 3/56
USPC .............................. 379/88.24, 93.21, 114.14, 379/202.01–207.1, 221.01, 221.08; 455/416, 432.3; 370/260–263, 265, 370/266, 338; 709/204; 348/14.08–14.1, 348/E7.083, 211.12–211.13
See application file for complete search history.

(56) References Cited

U.S. PATENT DOCUMENTS

| | | |
|---|---|---|
| 5,058,152 A | 10/1991 | Solomon et al. |
| 5,361,295 A | 11/1994 | Solomn |
| 5,590,184 A | 12/1996 | London |

(Continued)

*Primary Examiner* — Md S Elahee
(74) *Attorney, Agent, or Firm* — Scott P. Zimmerman, PLLC

(57) ABSTRACT

Methods, systems, and products are disclosed that provide disposable numbers for a conference service. A disposable number is assigned to a conference bridge that is only activated for a defined period of time, after which the disposable number is disposed and deactivated. A call is received to the disposable number, and the call is routed to the conference bridge. A database is queried that associates the disposable number to a subscriber's number. Subscriber information is retrieved that describes when a conference bridge subscription is active. If the conference bridge subscription is active, then a caller is connected to the conference bridge. If the conference bridge subscription is inactive, then the caller is prompted to pay for a conference service.

20 Claims, 10 Drawing Sheets

(56) References Cited

U.S. PATENT DOCUMENTS

| | | |
|---|---|---|
| 5,636,269 A | 6/1997 | Eisdorfer |
| 5,742,905 A | 4/1998 | Pepe et al. |
| 5,812,653 A | 9/1998 | Jodoin et al. |
| 5,892,821 A | 4/1999 | Turner |
| 5,903,629 A | 5/1999 | Campbell et al. |
| 5,933,785 A | 8/1999 | Tayloe |
| 5,952,934 A | 9/1999 | Matsumoto et al. |
| 6,047,056 A | 4/2000 | Patel |
| 6,088,719 A | 7/2000 | Murakami |
| 6,272,214 B1 | 8/2001 | Jonsson |
| 6,304,649 B1 | 10/2001 | Lauzon et al. |
| 6,327,353 B1 | 12/2001 | Fukuzawa |
| 6,332,163 B1 | 12/2001 | Bowman-Amuah |
| 6,393,117 B1 | 5/2002 | Trell |
| 6,393,424 B1 | 5/2002 | Hallman et al. |
| 6,430,602 B1 | 8/2002 | Kay et al. |
| 6,445,780 B1 | 9/2002 | Rosset et al. |
| 6,463,471 B1 | 10/2002 | Dreke et al. |
| 6,480,885 B1 | 11/2002 | Olivier |
| 6,513,013 B1 | 1/2003 | Stephanou |
| 6,519,628 B1 | 2/2003 | Locascio |
| 6,563,917 B2 | 5/2003 | Sabinson et al. |
| 6,687,242 B1 | 2/2004 | Enzmann et al. |
| 6,691,113 B1 | 2/2004 | Harrison et al. |
| 7,016,978 B2 | 3/2006 | Malik |
| 2002/0078007 A1 | 6/2002 | Herrero |
| 2002/0107014 A1 | 8/2002 | Kosuri |
| 2002/0143879 A1 | 10/2002 | Sommerer |
| 2002/0147701 A1 | 10/2002 | Chang |
| 2002/0173306 A1 | 11/2002 | Adamany et al. |
| 2002/0174237 A1 | 11/2002 | Shrinivasan et al. |
| 2003/0009439 A1 | 1/2003 | Lee |
| 2003/0018726 A1 | 1/2003 | Low et al. |
| 2003/0037112 A1 | 2/2003 | Fitzpatrick et al. |
| 2003/0065729 A1 | 4/2003 | Leinonen |
| 2003/0074213 A1 | 4/2003 | Murakami et al. |
| 2003/0074410 A1 | 4/2003 | Kay et al. |
| 2003/0108000 A1 | 6/2003 | Chaney et al. |
| 2003/0233415 A1 | 12/2003 | Beyda |
| 2004/0054428 A1 | 3/2004 | Sheha et al. |
| 2004/0101123 A1 | 5/2004 | Garcia |
| 2004/0243844 A1 | 12/2004 | Adkins |

DISPOSABLE TELEPHONE NUMBERS

CROSS-REFERENCE TO RELATED APPLICATIONS

This application is a continuation of U.S. application Ser. No. 13/936,230 filed Jul. 8, 2013 and since issued as U.S. Pat. No. 8,774,384, which is a continuation of U.S. application Ser. No. 13/299,486 filed Nov. 18, 2011 and since issued as U.S. Pat. No. 8,509,409, which is a continuation of U.S. application Ser. No. 12/283,446 filed Sep. 12, 2008 and since issued as U.S. Pat. No. 8,085,921, which is a continuation of U.S. application Ser. No. 09/741,346 filed Dec. 21, 2000 and since issued as U.S. Pat. No. 7,469,043, with all applications incorporated herein by reference in their entireties.

BACKGROUND

1. Field of the Invention

The present invention relates to telecommunications, and more particularly, to a system and method for providing a disposable telephone number service to telephone service subscribers.

2. Background of the Invention

Privacy is important to most people. Therefore, many individuals try to protect their privacy as much as possible. For example, many people do not want their telephone numbers be known to the public. To that end, they pay their telephone companies to avoid having their telephone numbers published in telephone directories. Unfortunately, having an unpublished telephone number cannot completely prevent unwanted incoming calls once a telephone number is voluntarily disclosed. The following examples illustrate the need for a disposable telephone number service.

First, consider a situation in which a host accommodates an out-of-town guest in her home for several days. While staying with the host, the guest has a need to receive telephone calls. The host agrees that the guest may disclose the host's telephone number to the guest's callers. The problem arises when the host continues to receive calls intended for the guest after the guest has left.

Second, consider a husband who advertises his family telephone number on the newspaper to sell a pick-up truck. The problem arises when he and his wife continue to receive unwanted telephone calls about the pick-up truck after the vehicle is sold. A different problem might exist even if the vehicle has not been sold. For example, the wife might not want to entertain any inquiry about the pick-up truck when the husband is not available.

Third, consider a single woman who has developed a friendship with a man over the Internet in a chat room, decides to have a telephone conversation with the man. The woman gives her telephone number to the man, and he calls her. After the telephone conversation, the woman decides that she does not want to continue the relationship, and asks the man not to call her again. The problem arises when the man continues to call her despite her protests.

In each of the above examples, the problem could be solved by requesting the telephone company to assign a new, perhaps unpublished, telephone number to replace the disclosed telephone number. However, this solution is inconvenient, because the subscriber must then notify his or her friends and relatives about the new telephone number.

Accordingly, there is a need for a disposable telephone number service. The service preferably uses a disposable telephone number that can be used for a definite period of time. A caller dialing the disposable telephone number during the definite period of time is connected to the subscriber of the service. The service can preferably be flexible so that the subscriber can deactivate the service during certain part of the day or certain days of the week.

SUMMARY OF THE INVENTION

The system of the present invention comprises a database and a routing device. The database can comprise subscriber information of a subscriber of the present invention. The subscriber information may include a true telephone number of the subscriber. The subscriber information may further include specific call routing instructions received from the subscriber. The subscriber information may be retrieved from the database using a disposable telephone number that is assigned to the subscriber. The disposable telephone number preferably has a recognizable NPA (the numbering plan area or more commonly known as the area code) that is dedicated for all disposable telephone numbers.

The routing device is adapted to receive a call that comprises the disposable telephone number as the called number. When the routing device receives the call, it consults the database. The routing device can then process the call in accordance with the subscriber information. For example, if the subscriber information indicates that the subscriber does not want to receive the call at that time, the routing device may play an announcement to the caller that the subscriber does not receive calls at that time. On the other hand, if the subscriber information indicates that the subscriber does receive calls at that time, the routing device forwards the call to the true telephone number of the subscriber.

Accordingly, it is an object of the present invention to provide a disposable telephone number service to help subscribers protect their privacy.

It is another object of the present invention to allow subscribers to define when telephone calls may be routed to their telephones.

These and other objects of the present invention are described in greater detail in the detailed description of the invention, the appended drawings, and the attached claims.

DETAILED DESCRIPTION OF PREFERRED EMBODIMENTS

Figure 1:
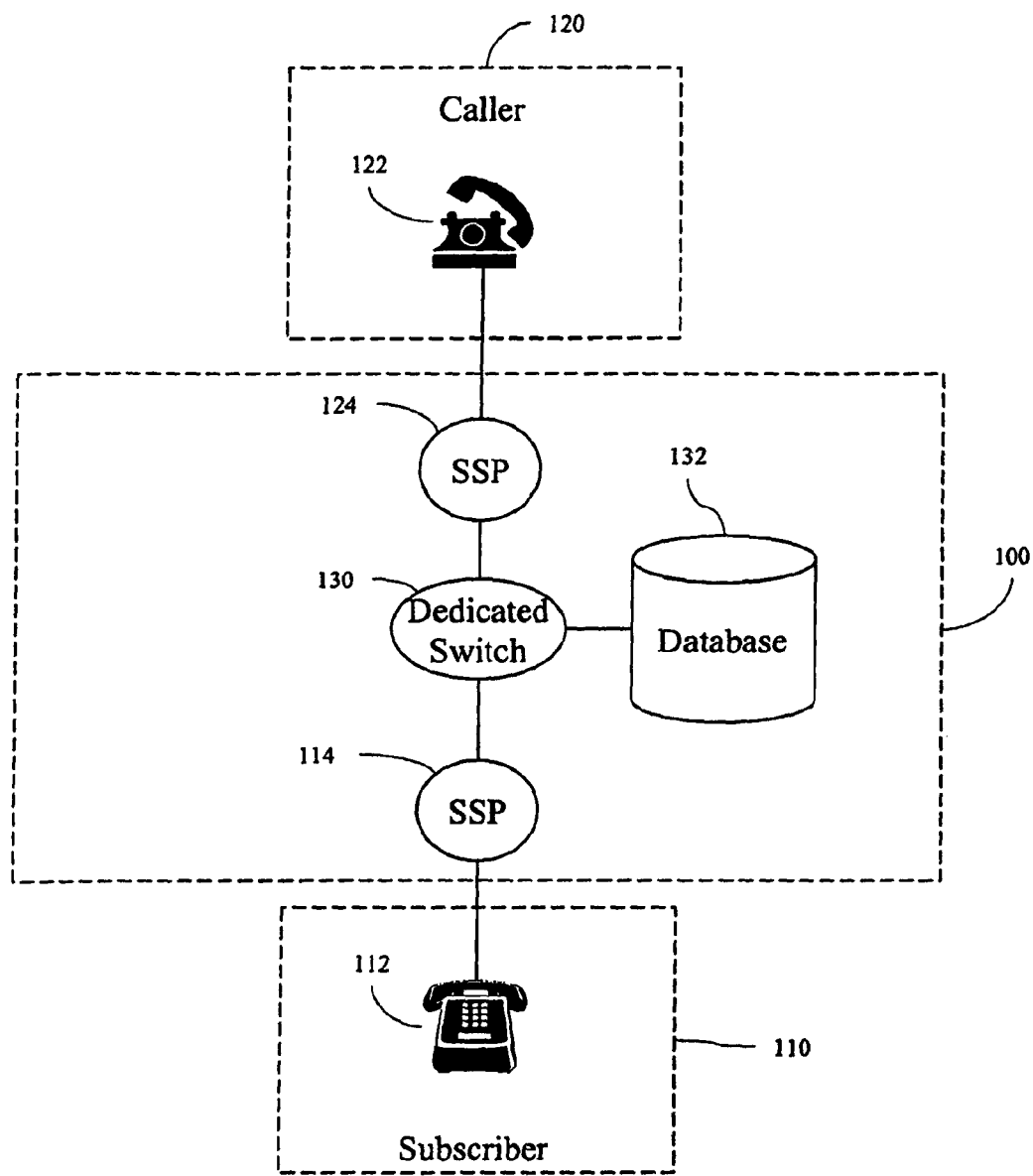
FIG. 1 is a schematic diagram showing the system architecture of a first preferred embodiment of the present invention.

FIG. 1 is a schematic diagram showing a first preferred embodiment of the system architecture of the present invention. In this embodiment, a switch may be dedicated to implement the present invention. For example, dedicated switch 130 shown in FIG. 1 may be used in conjunction with other components of telephone network 100 to implement the present invention. Dedicated switch 130 may be any of several types of suitable telecommunications switches. For example, dedicated switch 130 may be a tandem switch, a local switch, or other switches with similar capabilities.

Telephone network 100 may further comprise, for example, SSP 114 and SSP 124. SSP 114 and SSP 124 can be any of several types of suitable switches that are commonly used in central offices to route calls. In the context of an advanced intelligent network (AIN), SSP 114 and SSP 124 may be two service switching points.

SSP 114 may be connected to customer premises equipment (CPE) 112 of subscriber 110. Similarly, SSP 124 may be connected to CPE 122 of caller 120. Although it is shown in FIG. 1 that subscriber 110 and caller 120 are connected to two different SSPs, it is possible that the two parties may share one common SSP. CPE 112 and CPE 122 may be any suitable equipment. For example, CPE 112 and CPE 122 may be telephone sets. As it would be apparent to one skilled in the art, the present invention may be adapted for use in a wireless telephone network.

Dedicated switch 130 may be a delayed recent change switch. Dedicated switch 130 may comprise an internal clock. The internal clock may be set to activate dedicated switch 130 during specific time periods. For example, the clock may be set to activate dedicated switch 130 from February 1 to February 28, between 9 a.m. and 5 p.m. Preferably, a database is used to perform the timing function that activates or deactivates the disposable telephone number capability. Examples of a suitable dedicated switch 130 include model 5ESS manufactured by Lucent Technologies and model DMS-100 manufactured by Nortel Networks.

The system preferably comprises a database. For example, dedicated switch 130 may be connected to database 132. Database 132 can comprise a look up table. The look up table preferably relates disposable telephone numbers to true telephone numbers. In the preferred embodiment, when a disposable telephone number is received by dedicated switch 130, a true telephone number that is related to or associated with the disposable telephone number can be retrieved from database 132.

For example, assume that subscriber 110 has a true telephone number (123) 456-7890. Subscriber 110 may obtain a disposable telephone number from a service provider of the present invention. The disposable telephone number may be, for example, (999) 332-2323. The service provider may then associate the disposable telephone number with the true telephone number in a look up table. The look up table may be stored in database 132. The look up table may be, for example, as shown in Table 1 below.

TABLE 1

An Example of a Look Up Table

| Disposable telephone number | Subscriber | True Telephone Number |
|---|---|---|
| 999-332-2323 | Subscriber 110 | 123-456-7890 |

Figure 2:
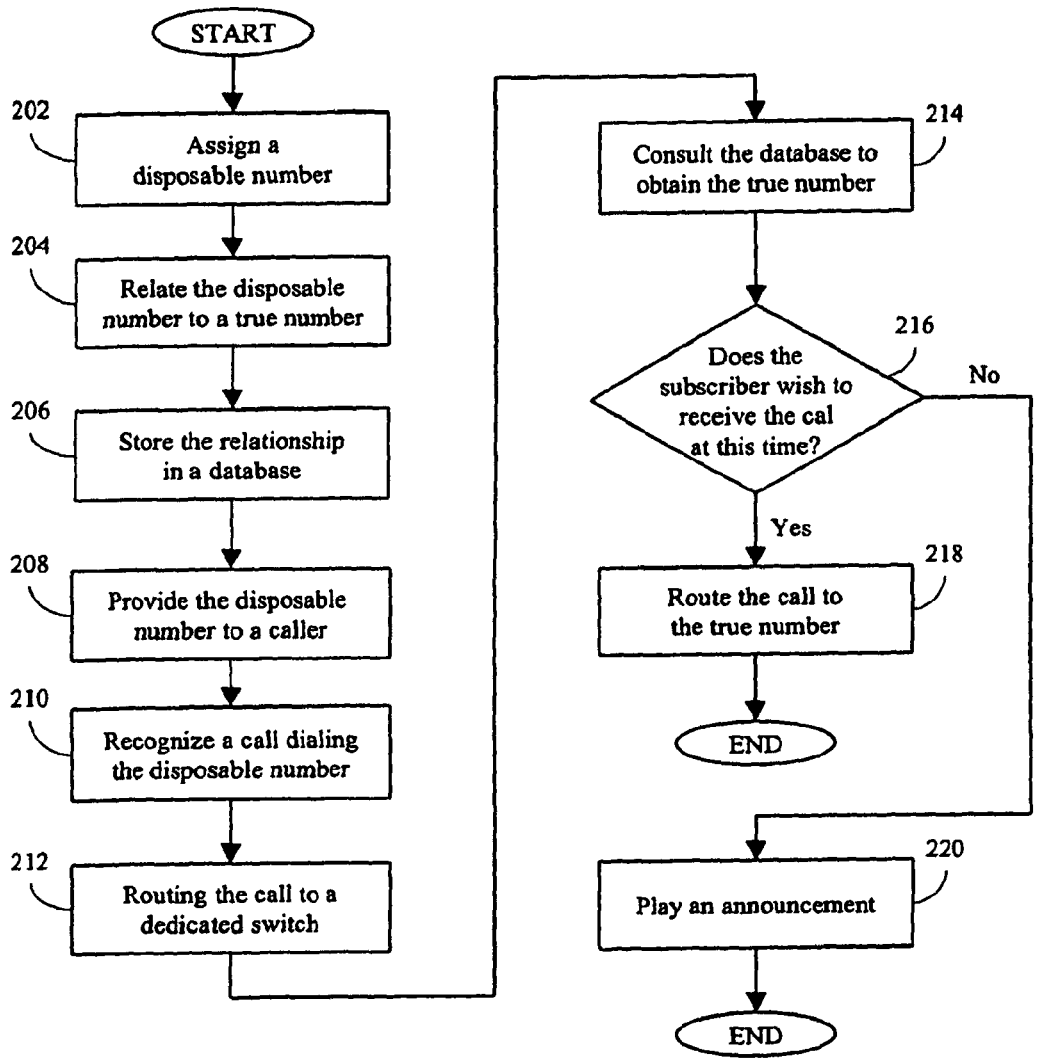
FIG. 2 is a flowchart illustrating the steps involved in using the first preferred embodiment of the present invention.

FIG. 2 is a flowchart illustrating the steps involved in using the first preferred embodiment in accordance with the present invention. In step 202, subscriber 110 can be assigned or provided with a disposable telephone number. The disposable telephone number preferably has a prefix or an NPA that is dedicated for all disposable telephone numbers. For example, a telephone number having the 10-digit format of NPA-NXX-XXXX with the NPA being "999" may be recognized as a disposable telephone number of the present invention. In a specific example, subscriber 110 may be provided with the disposable telephone number 999-332-2323. Alternatively, a seven-digit format may be used for disposable numbers on a regional basis. For example, within one or more area codes, the NXX part of the NXX-XXXX may be an exchange such as "999."

In step 204, the disposable telephone number can be related to or associated with a true telephone number of subscriber 110. For example, the 999-332-2323 disposable telephone number can be associated with the 123-456-7890 true telephone number of subscriber 110.

In step 206, the relationship between the disposable telephone number and the true telephone number may be stored. Preferably, the relationship is stored in a database. The database may be database 132 shown in FIG. 1. Database 132 may comprises a look up table that relates the disposable telephone number to the true telephone number. Again, Table 1 above is an example of the look up table.

In step 208, the disposable telephone number may be given to a caller from whom subscriber 110 wishes to receive a telephone call, but to whom subscriber 110 does not want to disclose the true telephone number. For example, subscriber 110 may provide the 999-332-2323 disposable telephone number to caller 120 without giving caller 120 the 123-456-7890 true telephone number.

In step 210, when caller 120 uses CPE 122 to dial 999-332-2323, SSP 124 recognizes that the call is intended for a disposable telephone number service subscriber because of the 999 NPA. In step 212, SSP 124 routes the call to a dedicated switch specifically provided for routing disposable telephone number calls. The dedicated switch may be dedicated switch 130.

In step 214, dedicated switch 130 consults database 132. For example, dedicated switch 130 may be programmed to access the look up table (e.g., Table 1) that contains the relationship between the disposable telephone number and the true telephone number.

In the preferred embodiment, the look up table may further comprise additional subscriber information. For example, the look up table may further comprise subscriber information shown in Table 2 below.

TABLE 2

Additional Subscriber Information

| True Telephone Number | Connect Call During | Play Announcement |
|---|---|---|
| 123-456-7890 | 9 am to 5 pm | At other times |

In step 216, Table 2 may be consulted by dedicated switch 130. In a first example, assume that caller 120 dials the disposable telephone number at 10 am. In this example, the applicable subscriber information retrieved from Table 2 would be to connect the call to the true telephone number. Routing of the call to the true telephone number may be performed in step 218.

Otherwise, in a second example in which caller 120 dials the disposable telephone number between 5 pm and 9 am, the applicable subscriber information retrieved from Table 2 would be to play an announcement. The announcement may be played in step 220. The announcement may be, for example: "The subscriber of the disposable telephone number 999-332-2323 does not receive calls at this time. Please try to call again between 9 am and 5 pm."

Figure 3:
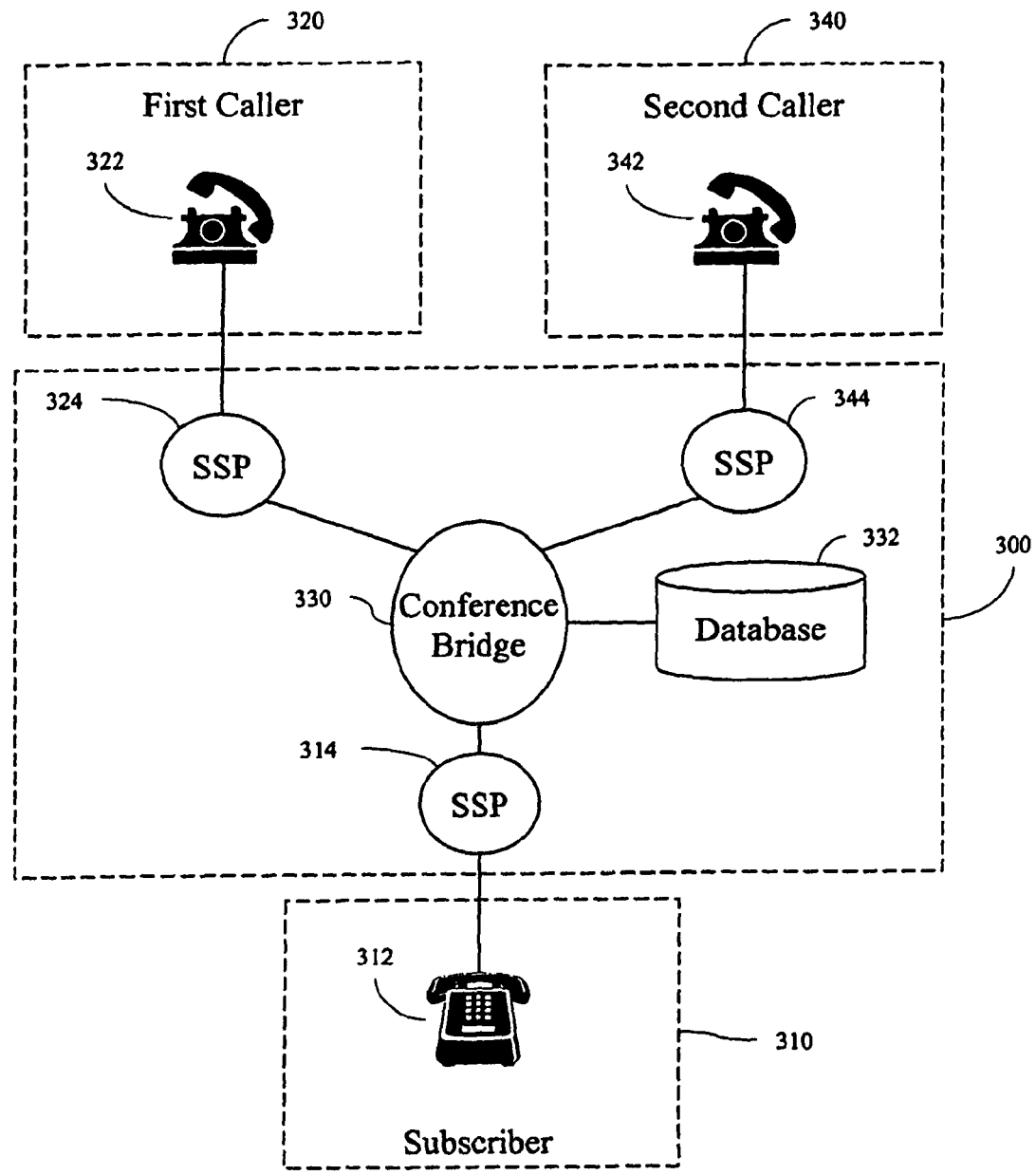
FIG. 3 is a schematic diagram showing a second preferred embodiment of the system architecture of the present invention.

FIG. 3 is a schematic diagram showing the system architecture of a second preferred embodiment of the present invention. In this embodiment, a service provider of the present invention may assign a disposable telephone number to a conference bridge. All calls dialing the disposable telephone number can be routed to the conference bridge. The conference bridge may be provided in the system architecture as conference bridge 330 in FIG. 3. Preferably, a meet-me conference bridge is used as conference bridge 330. An example of suitable meet-me conference bridge is that which is provided in the Nortel Networks DMS-100 switching system and populated in table "MMCONF" in the DMS system. Suitable hardware may include NT1X81AA and NT3X6AA of the DMS-100 system.

Telephone network 300 may comprise, for example, SSP 314, SSP 324, and SSP 344. SSP 314, SSP 324, and SSP 344 can be any suitable switches that are commonly used in central offices to route calls. SSP 314 may be connected to CPE 312 of subscriber 310. Similarly, SSP 324 may be connected to CPE 322 of first caller 320, and SSP 344 may be connected to CPE 342 of second caller 340. Although it is shown in FIG. 3 that subscriber 310, first caller 320, and second caller 340 are connected to three different SSPs, it is possible that fewer than three SSPs may be used. CPE 312, CPE 322, and CPE 342 may be any suitable equipment. For example, CPE 312, CPE 322, and CPE 242 may be telephone sets. As it would be apparent to one skilled in the art, the present invention may be adapted for use in a wireless telephone network.

The system preferably comprises a database. For example, database 332 may be provided so that it is accessible by conference bridge 330. Database 332 can comprise a look up table. The look up table preferably contains subscriber information. The subscriber information may include the status of the subscription account. For example, the subscription information may indicate when a call should be processed by conference bridge 330.

Figure 4:
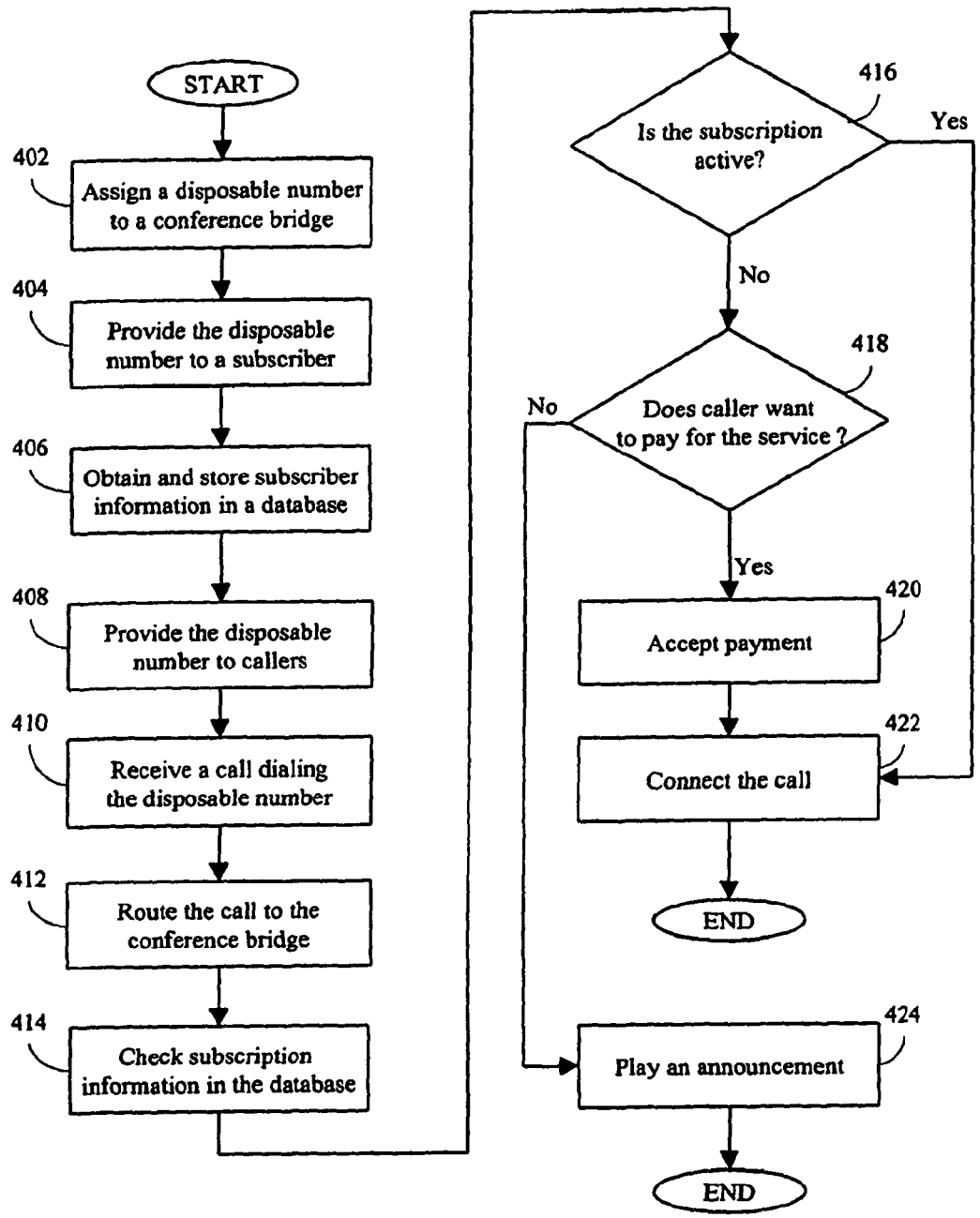
FIG. 4 is a flowchart illustrating the steps involved in using the second preferred embodiment of the present invention.

FIG. 4 is a flowchart illustrating the steps involved in using the second preferred embodiment of the present invention. In step 402, service provider 300 can assign a disposable telephone number to conference bridge 330. In step 404, the disposable telephone number can be provided to subscriber 310.

In step 406, subscriber information is obtained from subscriber 310. The subscriber information may include the time periods during which conference bridge 330 should be made available to process calls. For example, the subscriber information may specifically provide that conference bridge 310 must be available on a specific day during a specific time period. The subscriber information may further comprise information related to payment for the service. For example, the subscriber information may provide that each caller of conference bridge 330 must pay for the service before the caller will be allowed to use conference bridge 330.

In step 408, subscriber 310 provides the disposable telephone number to a number of callers. For example, the disposable telephone number may be provided to caller 320 and caller 340.

In step 410, when a person dials the disposable telephone number, the call is received at a switch. The person may be subscriber 310, first caller 320, and/or second caller 340. In the specific embodiment shown in FIG. 3, a call from subscriber 310, first caller 320, and second caller 340 would be received by SSP 314, SSP 324, and SSP 344, respectively. Each of SSP 314, SSP 324, and SSP 344 can recognize the disposable telephone number. Each of these SSPs can then route the call to conference bridge 330 in step 412.

In step 414, database 332 may be consulted. For example, conference bridge 330 may be preprogrammed to check the subscriber information related to the disposable telephone number.

In step 416, the call is processed depending on whether the subscription is active. If the subscription is active, then the caller dialing the disposable telephone number may be connected to an available channel of conference bridge 330 in step 422. If the subscription is not active, the process may be routed to step 418. In step 418, the caller may be asked if he or she would like to pay for the service. If the caller wishes to continue by making a payment, the payment is received in step 420. The payment may be received, for example, by accepting the caller's credit card number. In step 422, the caller may be connected to an available channel of conference bridge 330.

If in step 418 the caller does not want to pay for the service, the process goes to step 424 in which an announcement may be played. The announcement may be, for example, "You have decided to abandon this call. Good Bye."

Figure 5:
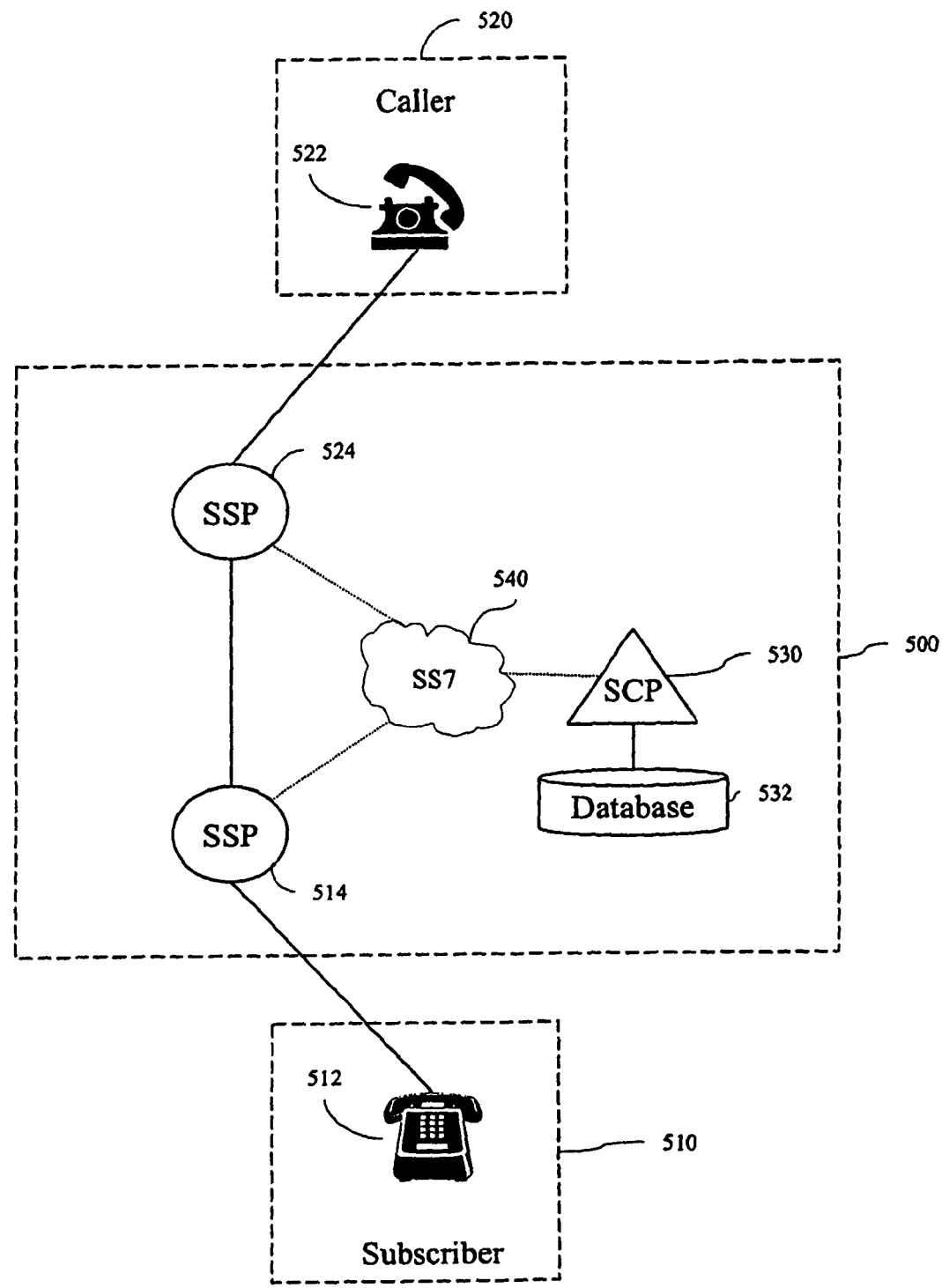
FIG. 5 is a schematic diagram showing a third preferred embodiment of the system architecture of the present invention.

FIG. 5 is a schematic diagram showing the system architecture of a third preferred embodiment of the present invention. Telephone network 500 can be an advanced intelligent network (AIN). Telephone network 500 may comprise, among other components, SSP 514, SSP 524, and SCP 530. SCP 530 may be a typical service control point in the MN. Signaling between SCP 530 with SSP 514 and SSP 524 may be channeled through signaling system 540. Signaling system 540 may be any suitable signaling system. In the preferred embodiment, signaling system 540 may be Signaling System Seven, which is commonly known as SS7.

SCP 530 can access database 532. Database 532 preferably comprises subscriber information. For example, subscriber information related to or associated with subscriber 510 may be stored in database 532. The subscriber information may contain a relationship linking the true telephone number of subscriber 510 and a disposable telephone number of the present invention. A query from a service switching point that carries the disposable telephone number as the called number may be responded by SCP 530 with the true telephone number as the called number in the response.

SSP 514 preferably has communication with CPE 512 of subscriber 510. Similarly SSP 524 may have communication with CPE 522 of caller 520. CPE 512 and CPE 522 may be telephone sets that can be used to make and receive telephone calls. As it is understood, the present invention may be adapted for a wireless telephone network.

Figure 6:
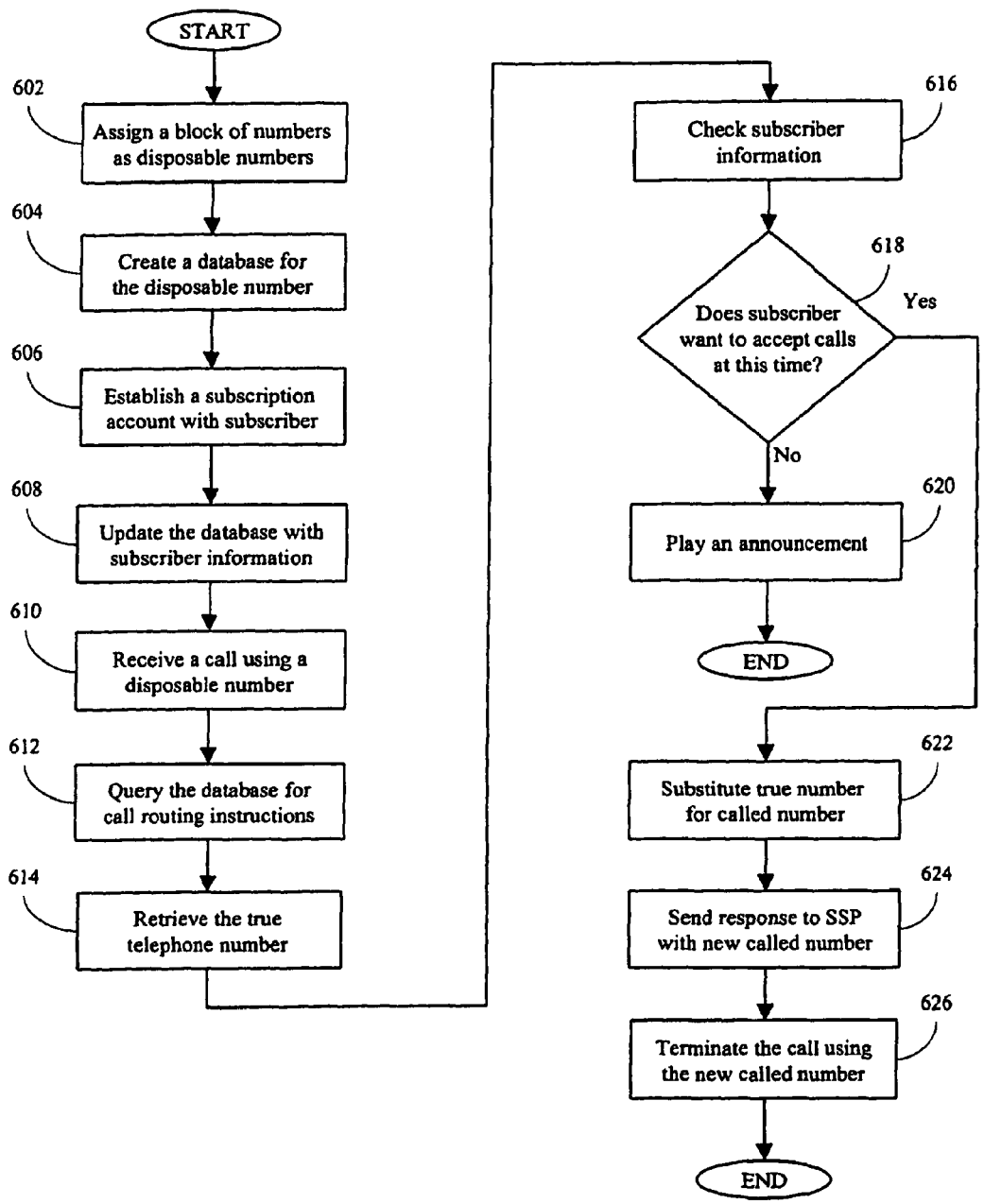
FIG. 6 is a flowchart illustrating the steps involved in using the third preferred embodiment of the present invention.

FIG. 6 is a flowchart illustrating the steps involved in using the third preferred embodiment of the present invention. In step 602, telephone network 500 assigns a block of telephone numbers as disposable telephone numbers. The disposable telephone number preferably has a common prefix or NPA.

For example, the NPA 999 may be used so that all disposable telephone numbers may have the 999-NXX-XXXX 10-digit format.

In step 604, telephone network 500 creates database 532 that is dedicated for the disposable telephone numbers. Database 532 may also be known as the disposable telephone number database. Database 532 is preferably accessible by SCP 530.

In step 606, telephone network 500 may establish a subscription account with subscriber 510. As part of the subscription account, subscriber 510 may be provided with a disposable telephone number. The account may be maintained by subscriber 510 based on any of several suitable payment schemes. For example, subscriber 510 may pay telephone network 500 a monthly fee for as many disposable telephone numbers as subscriber 510 wishes to have in a month. Subscriber 510 may also pay telephone network 500 a fixed fee for each disposable telephone number. In addition, subscriber 510 may pay telephone network 500 based on the number of calls received using the disposable telephone number service.

In step 608, telephone network 500 updates database 532. For example, the disposable telephone number assigned to subscriber 510 may be related to the true telephone number of subscriber 510 in a look up table. The look up table may be stored in database 532. An example of the look up table may be similar to Table 1 described above.

In step 610, when caller 520 dials the disposable telephone number, SSP 524 recognizes that the dialed number is a disposable telephone number. SSP 524 then launches a query to SCP 530. The query is preferably a TCAP message. The query may comprise, among other information, a called number field that contains the disposable telephone number as the called number.

In step 614, SCP 530 uses the called number in the query to look up the true telephone number in database 532. In step 616, SCP 530 further determines whether subscriber 510 has specific subscriber information in database 532.

In step 618, if the subscriber information in database 532 indicates that subscriber 510 does not want to receive calls at that time, the process goes to step 620. In step 620, an announcement may be played for caller 520. The message may be, for example, "The subscriber of the disposable telephone number you dialed does not receive calls at this time."

If in step 618 it was determined that the subscriber information in database 532 indicates that subscriber 510 wishes to receive calls at the time caller 520 dials the disposable telephone number, the process goes to step 622. In step 622, SCP 530 substitutes the true telephone number of subscriber 510 in the called number field for the disposable telephone number.

In step 624, SCP 530 returns a response to SSP 524. The response is preferably a TCAP message. The response comprises the true telephone number of subscriber 510 in the called number field.

In step 626, SSP 524 routes the call to the true telephone number. In this example, a call is established between caller 520 and subscriber 510 via SSP 524 and SSP 514. As a result, subscriber 510 can receive a call from caller 520 without caller 520 ever knowing the true telephone number of subscriber 510. In a preferred embodiment, subscriber 510 may be alerted of an incoming call that uses the disposable telephone number by a distinctive ringing on CPE 512.

Figure 7:
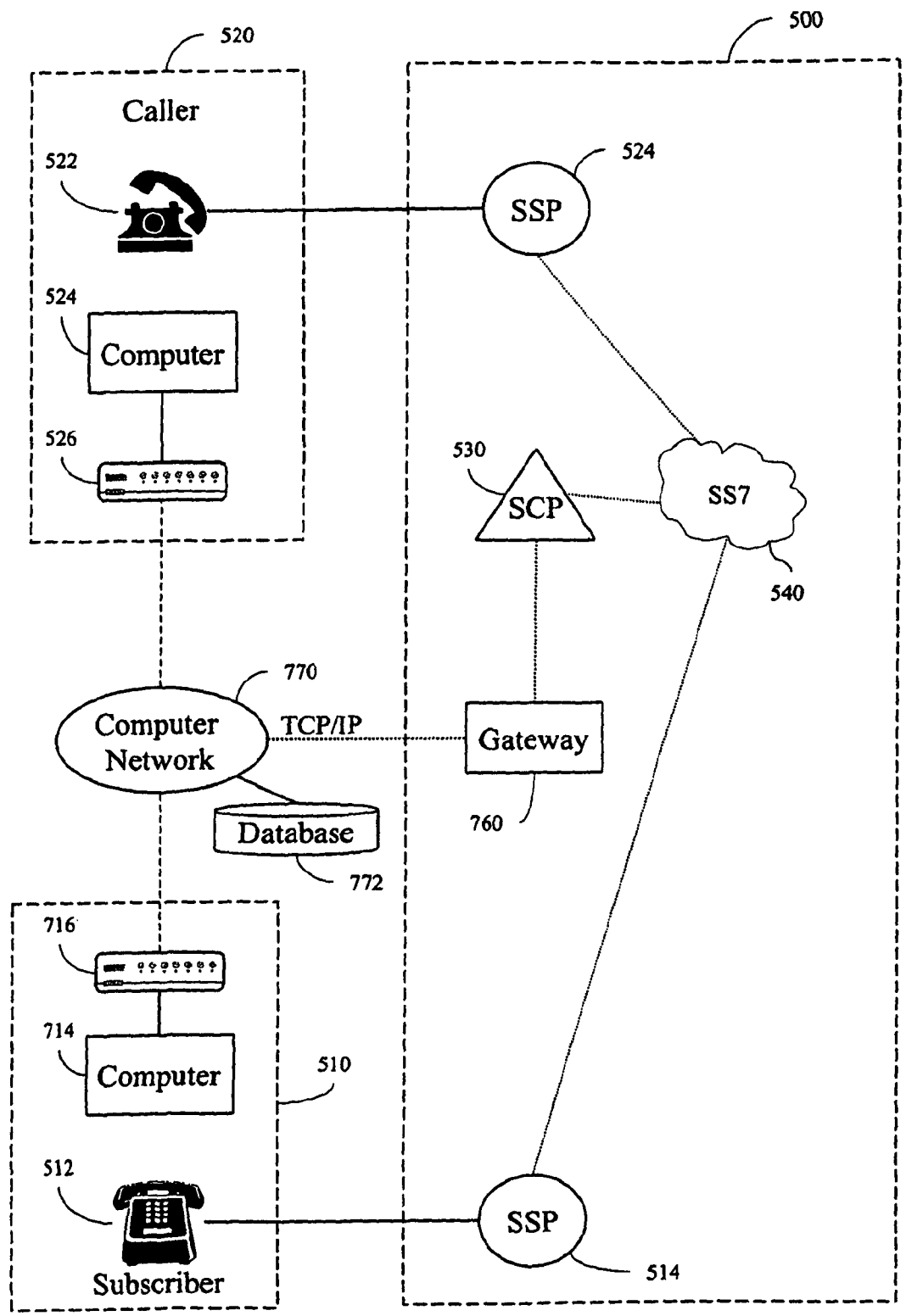
FIG. 7 is a schematic diagram showing a fourth preferred embodiment of the system architecture of the present invention.

FIG. 7 is a schematic diagram showing the system architecture of a fourth preferred embodiment the present invention. In this embodiment, telephone network 500 further comprises gateway 760 in addition to SSP 514, SSP 524, SCP 530, and signaling system 540. Gateway 760 enables SCP 530 to interact with non-MN systems. For example, gateway 760 can enable SCP 530 to interact with computer network 770. In the preferred embodiment, computer network 770 is the Internet. Through gateway 760, SCP 530 and computer network 770 may communicate or interact with each other using known protocols. One example of suitable protocols is the transmission control protocol/Internet protocol that is more commonly known as TCP/IP.

In addition to CPE 512, subscriber 510 can have computer 714 and modem 716. Using computer 714 and modem 716, subscriber 510 can access computer network 770. Through computer network 770, subscriber 510 can have access to database 772. In the preferred embodiment, subscriber 510 can edit his or her subscriber information that is contained in database 772. SCP 530 may access database 772 as well. For example, SCP 530 may access database 772 via gateway 760 and computer network 770, Subscriber 510 can also communicate with caller 520 over computer network 770. For example, caller 520 can access computer network 770 using computer 524 and modem 526. One example of communication between subscriber 510 and caller 520 over computer network 770 may be through an Internet chat room. In addition to communication over computer network 770, caller 520 may contact subscriber 510 using CPE 522 through telephone network 500 as shown in FIG. 7.

Figure 8:
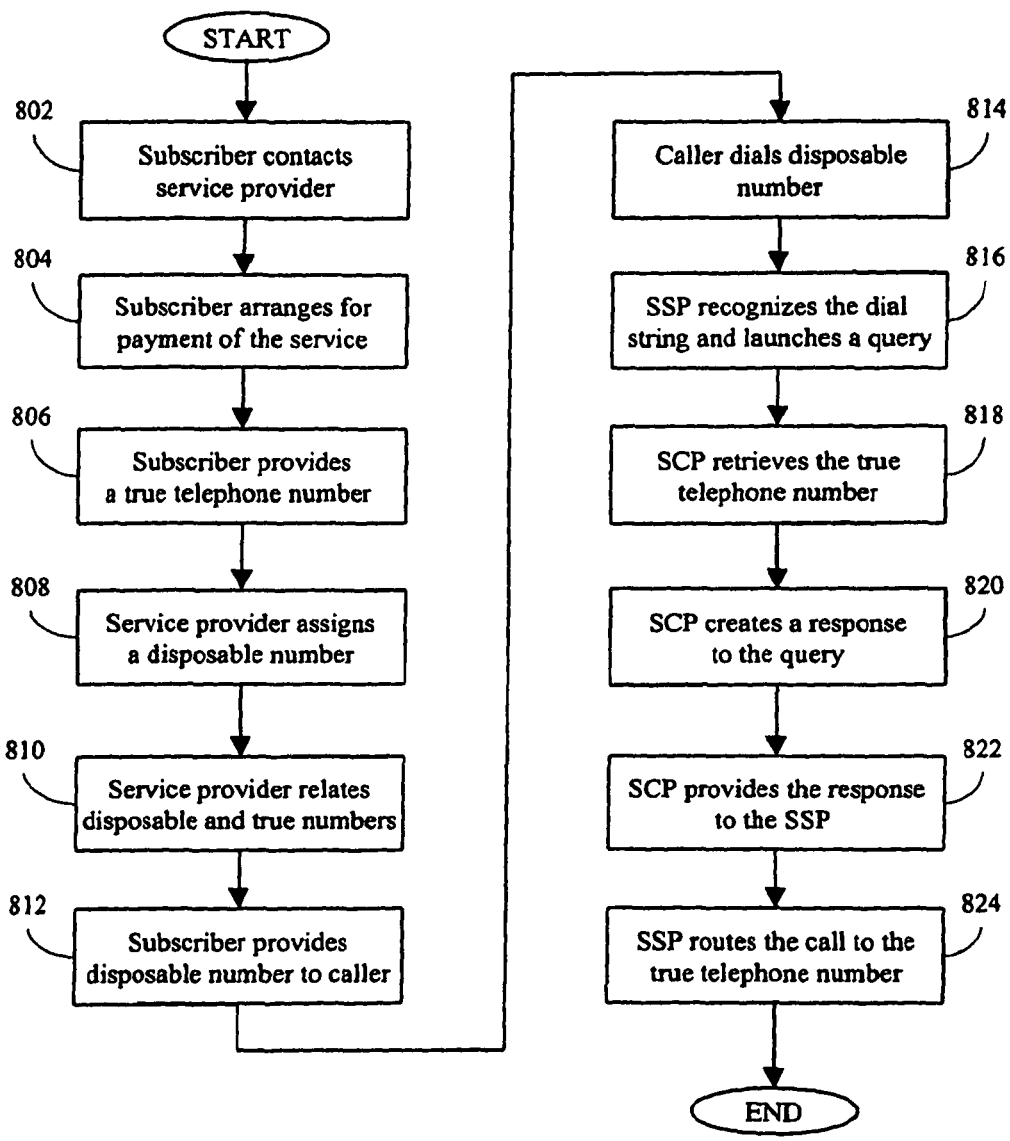
FIG. 8 is a flowchart illustrating the steps involved in using the fourth preferred embodiment of the present invention.

FIG. 8 is a flowchart illustrating the steps involved in using the fourth preferred embodiment in accordance with the present invention. Considering a situation in which subscriber 510 and caller 520 are two participants in an Internet chat room during a communication session. Subscriber 510 and caller 520 decide to have a live telephone voice conversation.

In step 802, subscriber 510 may contact a service provider of the present invention. The service provider may be any business entity. Preferably, the service provider is a telephone company. The contact may be made using a number of different methods. For example, subscriber 510 may call the business office of the service provider. Preferably, subscriber 510 may go to a website of the service provider by entering a uniform resource locator, e.g., www.chatonthephone.com, and be connected to the website over computer network 770. An alternative might be a conventional interactive, menu-driven system that is accessible via the telephone.

In step 804, subscriber 510 arranges for the payment of the disposable telephone number service. Preferably, subscriber 510 can provide his or her credit number to the service provider. Other payment methods may include charging the fees for the disposable telephone number as part of subscriber 510's telephone bill. In step 806, subscriber 510 provides his or her true telephone number to which calls dialing an associated disposable telephone number will be routed. The true telephone number may be, for example, 123-391-3333.

In step 808, the service provider provides the disposable telephone number to subscriber 510. The disposable telephone number may have 10 digits in the format of NPA-NXX-XXXX. The disposable telephone number may be, for example, 999-444-1212. Preferably, the three digit 999 is a dedicated NPA for disposable telephone number services. In the preferred embodiment, the service provider advertises the service of the present invention and the public is educated that all 999 telephone numbers are disposable telephone numbers, just like all 800 telephone numbers are dedicated as toll free numbers.

In step 810, the service provider relates the disposable telephone number to the true telephone number of subscriber 510. The relationship between the disposable telephone number and the true telephone number may be established, for example, in a table or a database. For example, database 772 may be used to store the relationship between the disposable telephone number and true telephone number. In database 772, the true telephone number 123-391-3333 is associated with the disposable telephone number 999-444-1212.

Database 772 may be hereinafter referred to as the disposable number database. Database 772 may further comprise additional subscriber information. The additional subscriber information may comprise call routing instructions. For example, the disposable number database may comprise a specific time of day during which an announcement is played to the caller when the call is received. The announcement may be, for example, "You have reached the disposable telephone number service. The disposable telephone number you have dialed is effective from January 1 to January 14. The subscriber of the disposable telephone number service does not receive calls between 11 pm and 7 am."

In step 812, subscriber 510 provides the disposable telephone number to caller 520. If subscriber 510 and caller 520 were still online in the Internet chat room, subscriber 510 may provide the disposable telephone number to caller 520 during the Internet chat session.

In step 814, caller 520 dials the disposable telephone number 999-444-1212 using CPE 522. In step 816, SSP 524 recognizes the 999-444-1212 dial string as a disposable telephone number. SSP 524 can therefore know that it has received a call intended for a subscriber of the service of the present invention. SSP 524 can then launch a query to SCP 530. The query may contain the disposable telephone number 999-444-1212 in the called number field of the query.

In step 818, when SCP 530 receives the query, SCP 530 uses the disposable telephone number or the called number to retrieve the true telephone number from database 772. Through gateway 760, SCP 530 may obtain the true telephone number from database 772 over computer network 770 using TCP/IP.

In step 820, SCP 530 can generate or formulate a response to the query. The response may comprise the true telephone number in the called number field, replacing the disposable telephone number. In other words, SCP 530 can replace 999-444-1212 in the called number field with 123-391-3333. In step 822, SCP 530 provides the response to SSP 524. In step 824, SSP 524 routes the call from caller 520 to subscriber 510 via SSP 514.

Figure 9:
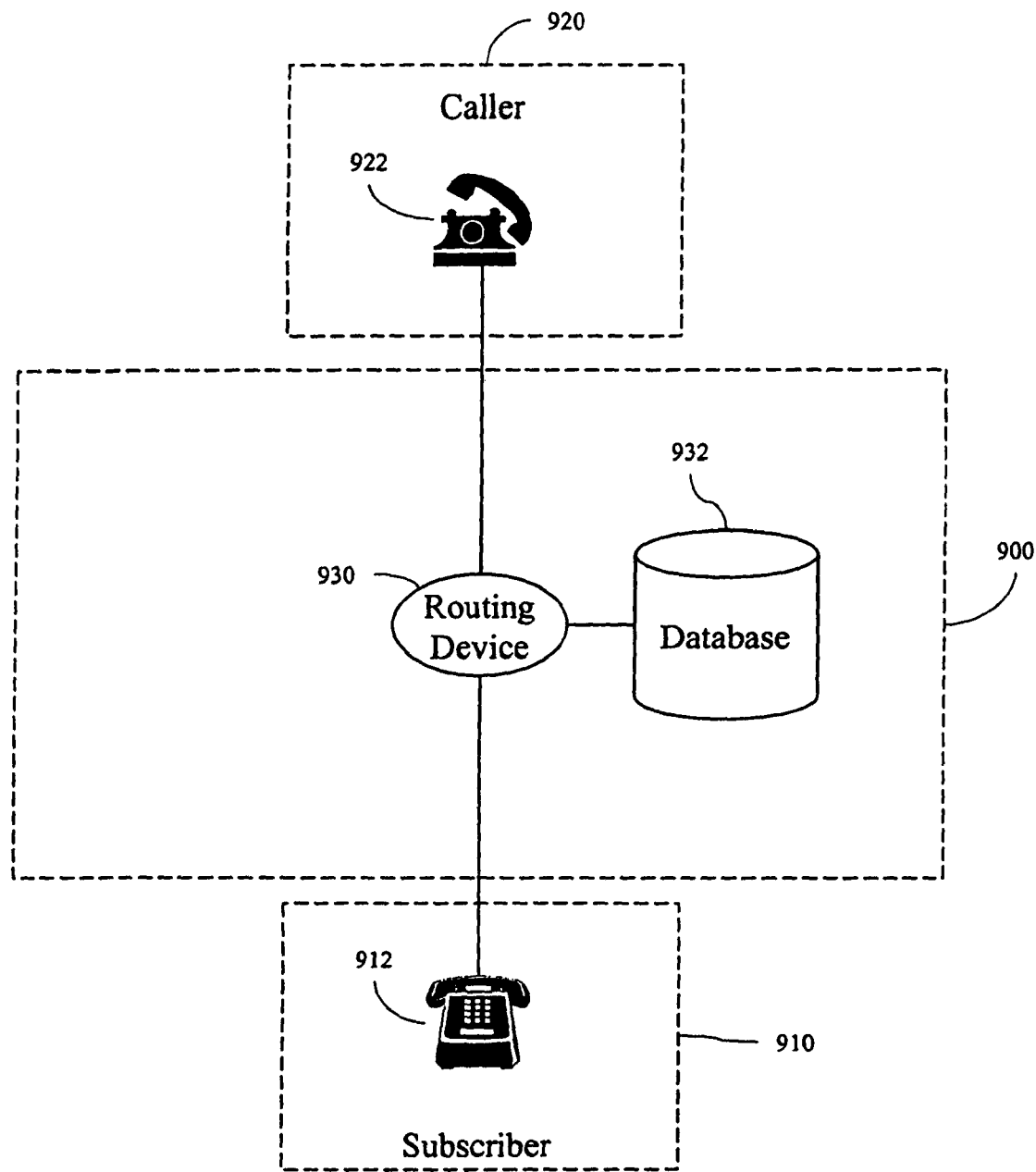
FIG. 9 is a schematic diagram showing the system architecture of the present invention.

FIG. 9 is a schematic diagram of a system architecture of the present invention. The present invention comprises routing device 930 and database 932. Routing device 930 may be any suitable devices, including those mentioned in the specific embodiments described above. For examples, dedicated switch 130, conference bridge 330, and SCP 530 may be used as routing device 930. In addition, telecommunications equipment suppliers such as Lucent Technologies and Nortel Networks may be provided with appropriate requirements to make new packetized switching devices suitable for use as routing device 930.

Database 932 can be any suitable memory devices that can associate disposable telephone numbers with true telephone numbers. Furthermore, database 932 may be used to store subscriber information as described above. Database 132, 332, 532, and 772 shown in FIGS. 1, 3, 5, and 7, respectively, are specific examples of database 932. Routing device 930 and database 932 are preferably owned and operated by service provider 900. As discussed above, service provider 900 may be a telephone company.

Subscriber 910 may have CPE 912. Subscriber 910 may use CPE 912 to obtain a disposable telephone number from service provider 900. When caller 920 dials the disposable telephone number using CPE 922, the call is routed to routing device 930. Routing device 930 can consult database 932 for call routing instructions.

Figure 10:
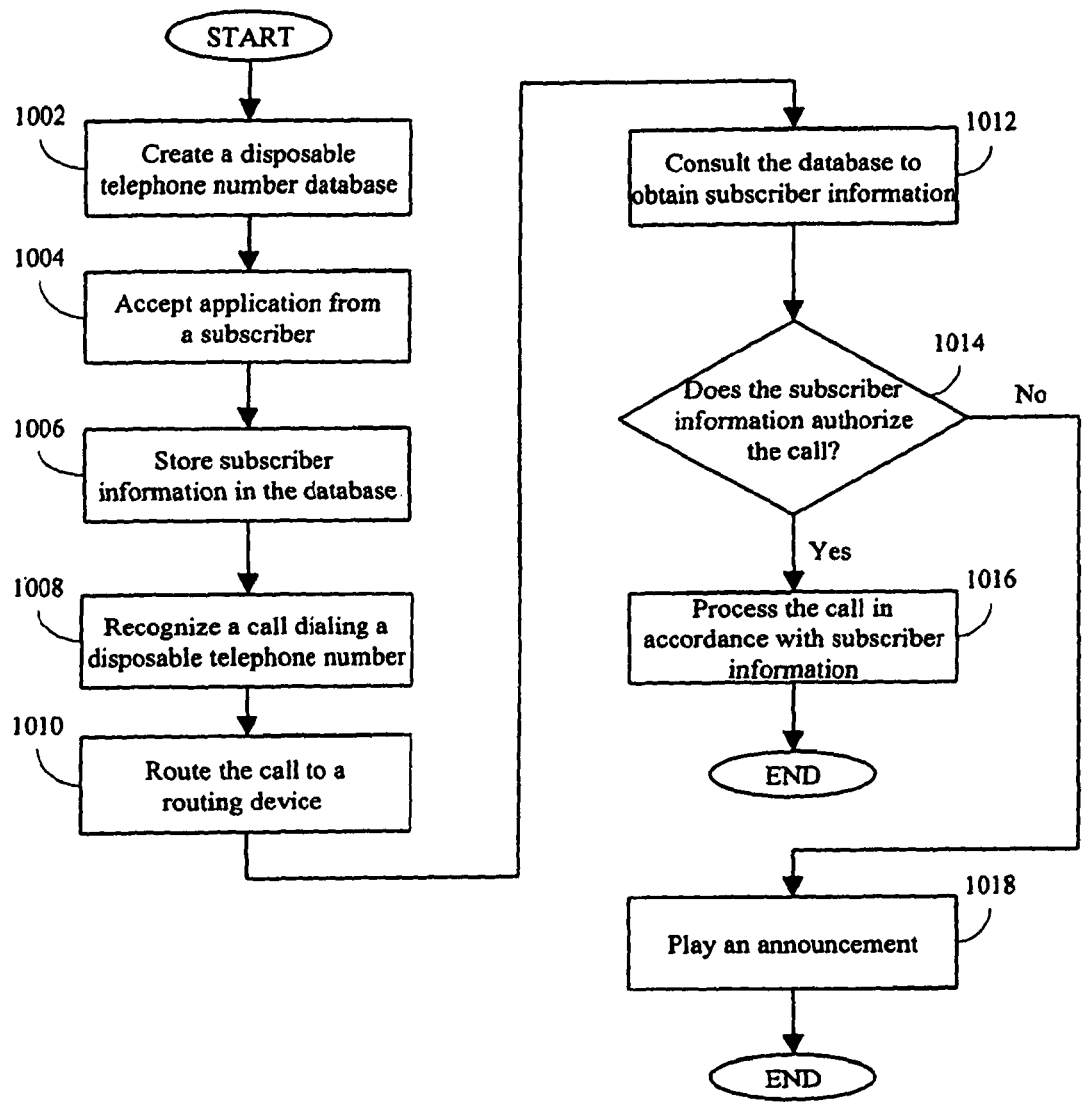
FIG. 10 is a flowchart illustrating the steps involved in using the architecture of FIG. 9.

FIG. 10 is a flowchart illustrating the steps involved in using the present invention. In step 1002, service provider 900 creates a disposable telephone number database. The database created may be database 932 that is connected to routing device 930, as shown in FIG. 9.

In step 1004, service provider 900 accepts an application from subscriber 910 who wishes to have a disposable telephone number. In step 1006, service provider 900 stores subscriber information in database 932. The subscriber information includes the true telephone number of subscriber 910. Preferably, the true telephone number is associated with a disposable telephone number that subscriber 910 can disclose to caller 920. In addition, the subscriber information may include subscriber rules. An example of a subscriber rule is a specific time period within which subscriber 910 may not want to receive calls.

In step 1008, when caller 920 dials the disposable telephone number that has been assigned to subscriber 910, service provider 900 detects the call. Detection of the call may be done using any known methods. For example, the disposable telephone number may have a dedicated NPA as part of the 10-digit telephone number. The call may be recognized by a switch that is connected to the telephone line of caller 920.

In step 1010, the call is routed to routing device 930. In step 1012, database 932 is consulted. Using the disposable telephone number, subscriber information and/or subscriber rules for subscriber 910 may be retrieved from database 932. In step 1014, it may be determined whether subscriber 910 wishes to accept the call. If the subscriber rules or subscriber information indicates that subscriber 910 would accept the call, the call is then processed in step 1016 in accordance with the subscriber information. Otherwise, an announcement may be played to caller 920 in step 1018. The announcement may be, for example, "The subscriber of this disposable telephone number does not accept calls at this time. Please try again later."

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

The invention claimed is:

1. A method, comprising:
    associating, by a server, a conference bridge to a defined period of time of activation, after which the conference bridge associated with a disposable number is deactivated;
    determining, by the server, an expiration of the conference bridge for a day and time of the call;
    disposing of, by the server, the disposable number in response to the expiration;
    receiving, by the server after disposal of the disposable number, a call from a calling number to the disposable number associated with the conference bridge;
    determining, by the server, the conference bridge is inactive for a date and time of the call to the disposable number;
    routing, by the server, the call to the conference bridge in response to the conference bridge being inactive;

sending, by the server, a prompt to the calling number to pay for the conference bridge in response to the conference bridge being inactive;

receiving, by the server, an acknowledgment of a payment for the conference bridge; and authorizing, by the server, the conference bridge in response to the payment.

2. The method of claim 1, further comprising retrieving subscription information associated with the conference bridge.

3. The method of claim 2, further comprising comparing the subscription information to the day and time of the call.

4. The method of claim 1, further comprising processing the payment for the conference bridge.

5. The method of claim 1, further comprising receiving a credit card number as the payment for the conference bridge.

6. The method of claim 1, further comprising receiving the payment for the conference bridge.

7. The method of claim 1, further comprising abandoning the conference bridge.

8. A system, comprising:

a processor; and a memory storing instructions that when executed cause the processor to perform operations, the operations comprising:

associating a disposable number to a conference bridge and to a subscriber phone number;

associating the conference bridge to a defined period of time of activation, after which the conference bridge is deactivated;

determining an expiration of the conference bridge;

disposing of the disposable number in response to the expiration of the conference bridge;

processing, after disposal, a call to the disposable number assigned to the conference bridge;

determining the conference bridge is inactive for a date and time of the call to the disposable number;

routing the call to the conference bridge in response to the conference bridge being inactive;

sending a prompt to a calling number of the call, the prompt requiring payment for a conference service in response to the conference bridge being inactive; and processing the conference service to the conference bridge in response to the payment.

9. The method of claim 8, further comprising retrieving subscription information associated with the conference bridge.

10. The method of claim 9, further comprising comparing the subscription information to the date and time of the call.

11. The method of claim 8, further comprising processing the payment for the conference service.

12. The method of claim 8, further comprising receiving a credit card number as the payment for the conference service.

13. The method of claim 8, further comprising receiving the payment for the conference service.

14. The method of claim 8, further comprising abandoning the conference bridge in response to a declination of the payment.

15. A memory device storing instructions that when executed cause a computer to perform operations, the operations comprising:

storing an association between a disposable number and information describing a conference bridge;

associating the conference bridge to a defined period of time of activation, after which the conference bridge is deactivated;

determining an expiration of the conference bridge;

disposing of the disposable number in response to the expiration;

receiving, after disposal of the disposable number, a call from a calling number to the disposable number;

determining the conference bridge is inactive for a date and time of the call to the disposable number;

routing the call to the conference bridge in response to the conference bridge being inactive;

sending a prompt to the calling number of the call, the prompt requiring payment for a conference service in response to the conference bridge being inactive; and processing the conference service to the conference bridge in response to the payment.

16. The memory device of claim 15, wherein the operations further comprise processing an announcement associated with the disposable number.

17. The memory device of claim 15, wherein the operations further comprise processing a distinctive ring associated with the disposable number.

18. The memory device of claim 15, wherein the operations further comprise processing the payment.

19. The memory device of claim 15, wherein the operations further comprise receiving a credit card number as the payment.

20. The memory device of claim 19, wherein the operations further comprise processing a credit card number as the payment.

* * * * *